United States Patent
Puiu et al.

(10) Patent No.: US 8,512,187 B2
(45) Date of Patent: Aug. 20, 2013

(54) MULTI-MODE DRIVE UNIT

(75) Inventors: Dumitru Puiu, Sterling Heights, MI (US); Goro Tamai, West Bloomfield, MI (US); Scott A. Miller, Northville, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 129 days.

(21) Appl. No.: 12/882,928

(22) Filed: Sep. 15, 2010

(65) Prior Publication Data

US 2012/0065014 A1    Mar. 15, 2012

(51) Int. Cl.
*F16H 3/72*    (2006.01)

(52) U.S. Cl.
USPC ............................................................ 475/5

(58) Field of Classification Search
None
See application file for complete search history.

(56) References Cited

U.S. PATENT DOCUMENTS

| | | | |
|---|---|---|---|
| 5,845,731 A | 12/1998 | Bugllone et al. | |
| 5,931,757 A | 8/1999 | Schmidt | |
| 6,090,005 A | 7/2000 | Schmidt et al. | |
| 6,478,705 B1 | 11/2002 | Holmes et al. | |
| 6,527,659 B1 | 3/2003 | Klemen et al. | |
| 6,862,887 B2 | 3/2005 | Noreikat et al. | |
| 7,192,373 B2 | 3/2007 | Bucknor et al. | |
| 7,217,211 B2 | 5/2007 | Klemen et al. | |
| 7,261,660 B2 | 8/2007 | Sowul et al. | |
| 7,278,941 B2 | 10/2007 | Holmes et al. | |
| 7,367,910 B2 | 5/2008 | Schmidt | |
| 7,678,005 B2 | 3/2010 | Tuckfield | |
| 2008/0208422 A1* | 8/2008 | Shibata et al. | 701/54 |
| 2009/0011887 A1 | 1/2009 | Komada et al. | |
| 2009/0176610 A1 | 7/2009 | Conlon | |
| 2010/0012407 A1 | 1/2010 | Oba et al. | |
| 2010/0044128 A1 | 2/2010 | Oba et al. | |
| 2012/0310461 A1 | 12/2012 | Maruyama et al. | |

FOREIGN PATENT DOCUMENTS

| | | |
|---|---|---|
| WO | WO-2007-110721 A1 | 10/2007 |
| WO | WO-2008-050664 A1 | 5/2008 |
| WO | WO-2011-108408 A1 | 9/2011 |

\* cited by examiner

*Primary Examiner* — Erin D Bishop
(74) *Attorney, Agent, or Firm* — Frederick A. Krieger

(57) ABSTRACT

Multi-mode operation is provided for an electrically variable transmission for a motor vehicle. The multi-mode electrically variable transmission provides for multiple gear ratios and power flow configurations including fixed gear operation. An improved input-split planetary gear set configuration is provided for the multi-mode electrically variable transmission. The multi-mode electrically variable transmission may be operated in its desired efficiency and/or performance range more frequently. Further, the transmission reduces clutch torques and provides improved functionality in range-extended electric vehicles and battery electric vehicles. The multi-mode electrically variable transmission is provided with a fixed gear operating capability for improved highway cruising and incorporates a reverse gear for reverse operation.

2 Claims, 11 Drawing Sheets

MULTI-MODE DRIVE UNIT

FIELD OF THE INVENTION

Embodiments disclosed herein relate generally to a transmission for a motor vehicle, and more particularly, to an electrically variable transmission having a multiple modes of operation.

BACKGROUND OF THE INVENTION

A multi-mode electrically variable transmission is an advantageous new transmission design that has the ability to reduce engine and electric motor losses at low as well as high vehicle speeds. However, depending on the implementation of the mode-changing mechanism, a multi-mode electrically variable transmission ("multi-mode EVT") has potential disadvantages. For example, a multi-mode EVT may experience higher transmission spin losses due to clutch drag and multiple planetary gear set friction. Further, the gearing range within some multi-mode EVTs may limit the electric vehicle ("EV") drive capabilities.

The gearing of a typical EVT must be designed with a compromise between city and highway driving in mind. As a result, the gearing of the typical EVT will often be higher than desirable for city driving in order to achieve adequate vehicle speeds during highway driving and lower than desirable for highway driving in order to provide adequate city driving performance. This compromise and the design of typical EVTs also means that exceedingly high torques are often applied to clutches within the EVT. Further, when operating purely under battery power without the propulsive force from the engine, the maximum final drive speed is limited by the component speeds of a planetary gear set within the EVT. Thus, in a battery electric vehicle or when used in a range-extended electric vehicle, EVTs typically have a limited top speed resulting from the city and highway gearing compromise made within the EVT. Therefore, an EVT is desirable that provides greater kinematic variability within the transmission while minimizing the compromise between city and highway performance.

In addition, a typical EVT is subject to increased mechanical and electrical losses during highway operation. These losses stem from internal friction within the EVT as well as the inherent electrical losses of using one electrical motor as a generator to power a second electrical motor. Thus, an EVT is desirable that provides for fixed gear operation with efficient highway cruising.

A typical EVT has limited reverse gear operation and relies solely upon one of its electric motors to provide reverse propulsion. This is problematic during situations in which electric power may be limited such as in extremely hot or cold climates. If electric power fails or provides inadequate propulsive force, the vehicle is simply unable to move in reverse. Thus, an EVT is needed that allows the EVT to harness the propulsive force of the engine for reverse gear operation, or that can use both electric motors of the EVT to provide reverse propulsion if battery power is adequate.

It is, therefore, desirable to provide an EVT that keeps the engine operating within its efficiency and/or power range while also providing satisfactory city and highway performance. It is also desirable to provide an EVT with reduced clutch torques and improved functionality in range-extended electric vehicles and battery electric vehicles. It is also desirable to provide an EVT with a fixed gear operating capability for improved highway cruising and a reverse gear for vehicle reverse operation.

BRIEF SUMMARY OF THE INVENTION

In an example embodiment, a transmission having a transmission input shaft and a planetary gear set is provided. The planetary gear set includes a first sun gear, at least two first pinion gears meshed with the first sun gear, a first carrier coupled to the at least two first pinion gears and the transmission input shaft, and a first ring gear meshed with the at least two first pinion gears. The transmission also includes a first electric motor coupled to the first sun gear, a second electric motor coupled to the first ring gear, and an output gear. The output gear is selectively coupled to the first electric motor to provide a first transmission gear ratio, and the output gear is selectively coupled to the second electric motor to provide a second transmission gear ratio.

In another example embodiment, a transmission having a transmission input shaft and a planetary gear set is provided. The planetary gear set includes a sun gear, a plurality of pinion gears meshed with the sun gear, a carrier coupled to the plurality of pinion gears and the transmission input shaft, and a ring gear meshed with the plurality of pinion gears. The transmission also includes a first electric motor coupled to the sun gear, a second electric motor coupled to the ring gear, and an output gear. The output gear is selectively coupled to the first electric motor to provide a first transmission gear ratio, and the output gear is selectively coupled to the second electric motor to provide a second transmission gear ratio.

In another example embodiment, a transmission having a transmission input shaft and a planetary gear set is provided. The planetary gear set includes a sun gear, a plurality of pinion gears meshed with the sun gear, a carrier coupled to the plurality of pinion gears and the transmission input shaft, and a ring gear meshed with the plurality of pinion gears. The transmission also includes a first electric motor coupled to the sun gear, a second electric motor coupled to the ring gear, and an output gear. The output gear is selectively coupled to the first electric motor, and the output gear is selectively coupled to the second electric motor.

One advantage of the disclosed embodiments is that an improved input-split planetary gear set configuration is provided for the multi-mode EVT. The multi-mode EVT may be operated in its desired efficiency and/or performance range more frequently. Further, the transmission reduces clutch torques and provides improved functionality in range-extended electric vehicles and battery electric vehicles. The multi-mode EVT is provided with a fixed gear operating capability for improved highway cruising and a reverse gear for vehicle reverse operation.

BRIEF DESCRIPTION OF THE DRAWINGS

The technology is illustrated and described herein with reference to the various drawings, in which like reference numbers denote like method steps and/or system components, and in which.

DETAILED DESCRIPTION OF THE PREFERRED EMBODIMENTS

Figure 1:
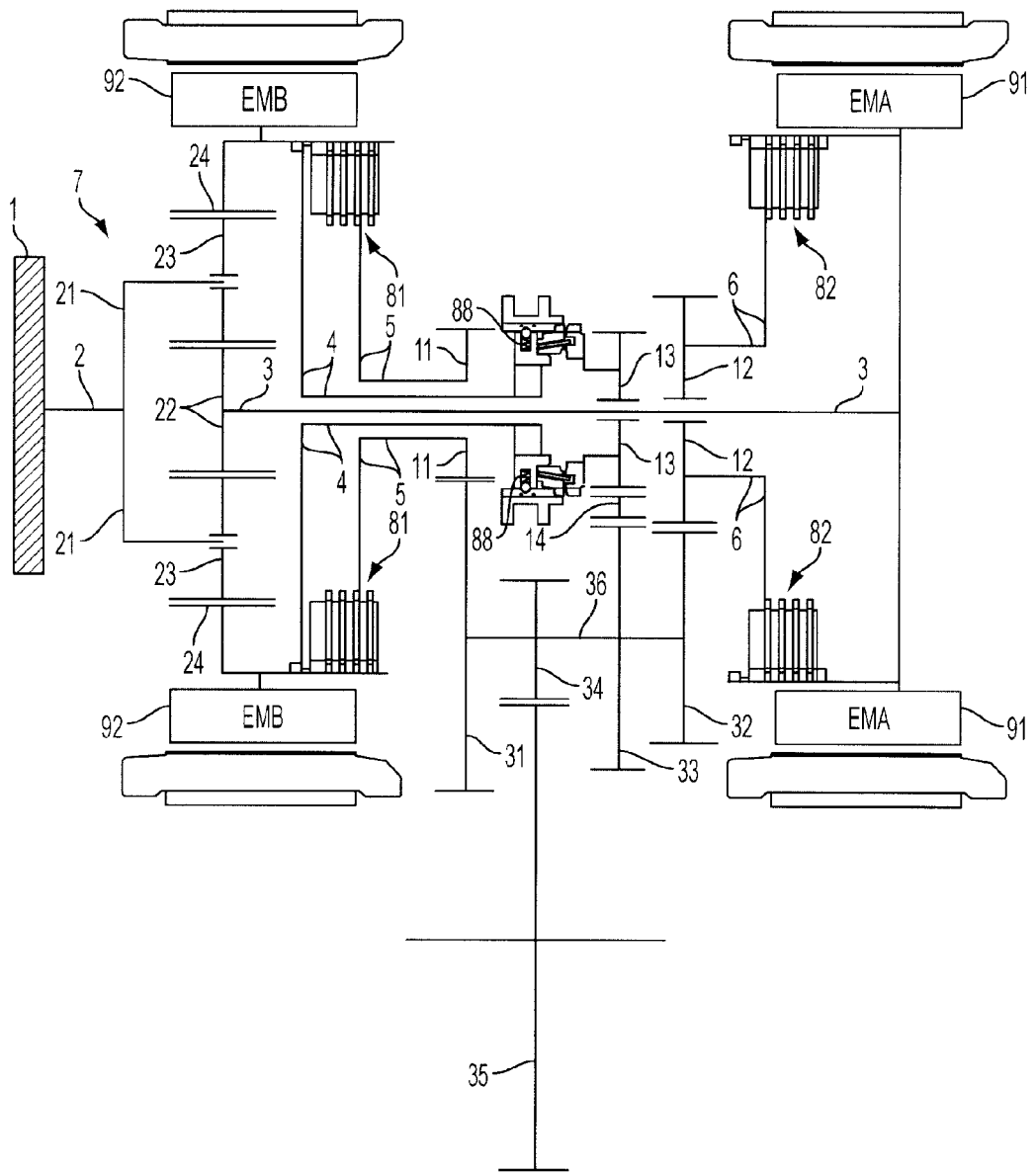
FIG. 1 illustrates an example multi-mode electrically variable transmission having multiple operating modes according to an embodiment disclosed herein.

FIG. 1 illustrates an example multi-mode electrically variable transmission ("MM-EVT") having multiple operating modes according to an embodiment disclosed herein. The MM-EVT is coupled to an engine 1 by a transmission input shaft 2. The transmission input shaft 2 is also coupled to a carrier 21 of an input-split planetary gear set 7. The input-split planetary gear set 7 is a conventional planetary gear set as would be readily understood by one of ordinary skill in the art and includes a sun gear 22, a plurality of pinion gears 23 and a ring gear 24. The pinion gears 23 are rotatably mounted on the carrier 21. Each planetary gear 23 is continuously meshed with the sun gear 22 and the ring gear 24. The sun gear 22 is non-rotatably coupled by a shaft 3 to electric motor A 91 ("EMA"). The ring gear 24 is non-rotatably coupled to electric motor B 92 ("EMB").

EMB 92 is also non-rotatably coupled to a first clutch mechanism 81. The first clutch mechanism 81 selectively non-rotatably couples EMB 92 to a shaft 5. The shaft 5 is non-rotatably coupled to a first driver gear 11. EMB 92 is also non-rotatably coupled to a shaft 4. The shaft 4 is non-rotatably coupled to a synchronizer mechanism 88. The synchronizer mechanism 88 is longitudinally movable along the shaft 4 and may be moved into contact with reverse driver gear 13, thereby locking the reverse driver gear 13 to the shaft 4. EMA 92 is non-rotatably coupled to a second clutch mechanism 82. The second clutch mechanism 82 selectively non-rotatably couples EMA 92 to shaft 6. Shaft 6 is non-rotatably coupled to a second driver gear 12.

The MM-EVT also includes an output shaft 36 non-rotatably coupled to a first driven gear 31 continuously meshed with the first driver gear 11, second driven gear 32 continuously meshed with the second driver gear 12, and a reverse driven gear 33 continuously meshed with a reverse idler gear 14, which is continuously meshed with the reverse driver gear 13. An output gear 34 is non-rotatably coupled to the output shaft 36. The output gear 34 is continuously meshed with a final drive output 35 that distributes propulsive force from the MM-EVT.

The MM-EVT of FIG. 1 may be configured for operation in several different modes. For operation of the MM-EVT in a first transmission gear ratio with the engine 1 and EMB 92 providing propulsive force and EMA 91 generating electrical power, the first clutch mechanism 81 is activated, the second clutch mechanism 82 is deactivated, and the synchronizer mechanism 88 is kept out of contact with the reverse driver gear 13. To switch the MM-EVT to operate in a second transmission gear ratio from the first transmission gear ratio, the MM-EVT is first switched to operate in a fixed gear state by adjusting the RPM of EMA 91 to match the RPM of shaft 6. Once the RPM of EMA 91 approximates the RPM of shaft 6, the second clutch mechanism 82 is activated in addition to the already activated first clutch mechanism 81, and the synchronizer mechanism 88 is kept out of contact with the reverse driver gear 13. When the MM-EVT enters fixed gear operation from the first transmission gear ratio, the engine 1 and EMB 92 are providing propulsive force while EMA 91 is generating electrical power. To switch to operate in the second transmission gear ratio, EMB 92 is switched to a generating mode and EMA 91 is switched to provide propulsive force. To complete the switch of the MM-EVT into the second transmission gear ratio with the engine 1 and EMA 91 providing propulsive force and EMB 92 generating electrical power, the second clutch mechanism 82 remains activated, the first clutch mechanism 81 is deactivated, and synchronizer mechanism 88 is kept out of contact with the reverse driver gear 13. To switch the MM-EVT to operate in the first transmission gear ratio from the second transmission gear ratio, the MM-EVT is first switched to operate in a fixed gear state by adjusting the RPM of EMB 92 to match the RPM of shaft 5. Once the RPM of EMB 92 approximates the RPM of shaft 5, the first clutch mechanism 81 is activated in addition to the already activated second clutch mechanism 82, and the synchronizer mechanism 88 is kept out of contact with the reverse driver gear 13. When the MM-EVT enters fixed gear operation from the second transmission gear ratio, the engine 1 and EMA 91 are providing propulsive force while EMB 92 is generating electrical power. To switch to operate in the first transmission gear ratio, EMA 91 is switched to a generating mode and EMB 92 is switched to provide propulsive force. To complete the switch to the first transmission gear ratio, the first clutch mechanism 81 remains activated, the second clutch mechanism 82 is deactivated, and synchronizer mechanism 88 is kept out of contact with the reverse driver gear 13. For operation of the MM-EVT in reverse, the first clutch mechanism 81 and second clutch mechanism 82 are deactivated and the synchronizer mechanism 88 is moved into contact with the reverse driver gear 13, thereby locking the reverse driver gear 13 to shaft 4.

Figure 2:
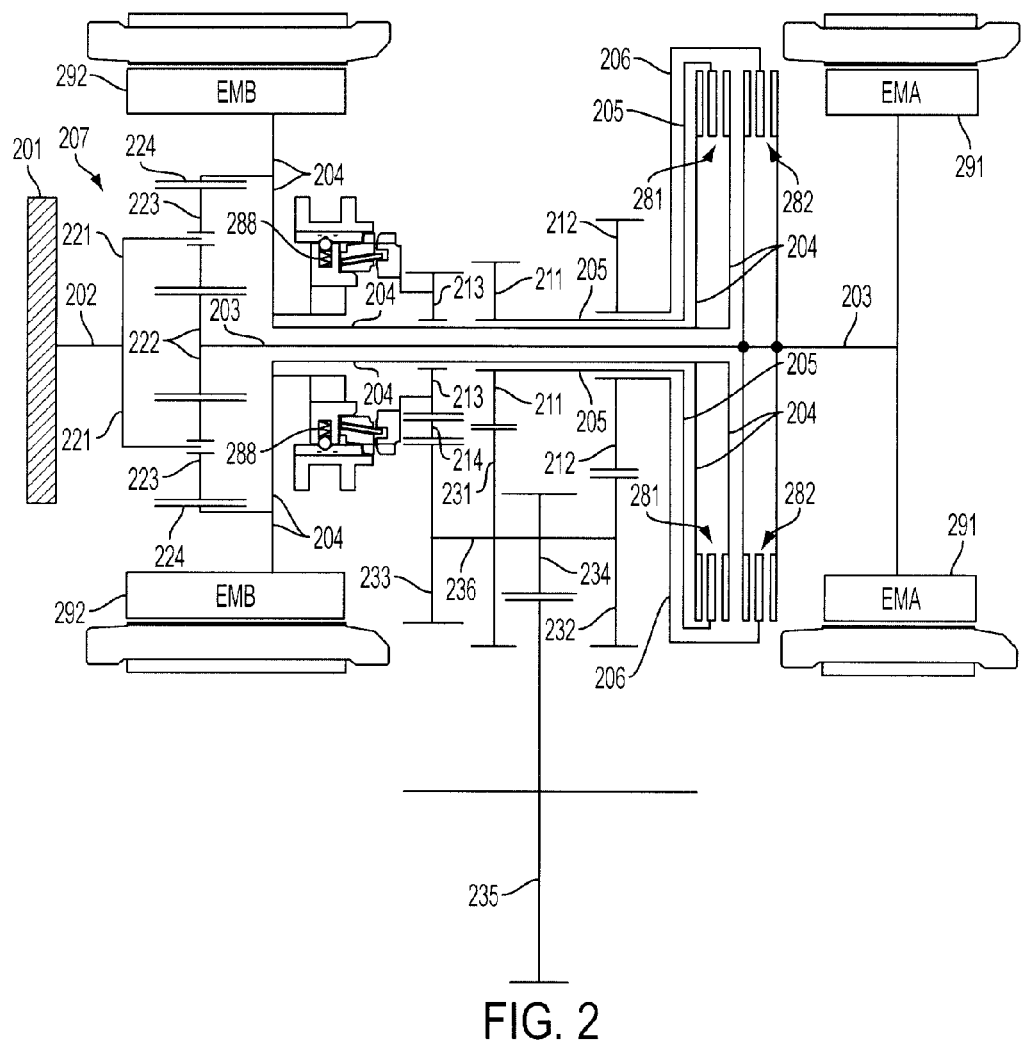
FIG. 2 illustrates an example multi-mode electrically variable transmission having multiple operating modes according to another embodiment disclosed herein.

FIG. 2 illustrates an example multi-mode electrically variable transmission ("MM-EVT") having multiple operating modes according to another embodiment disclosed herein.

The MM-EVT is coupled to an engine 201 by a transmission input shaft 202. The transmission input shaft 202 is also coupled to a carrier 221 of an input-split planetary gear set 207. The input-split planetary gear set 207 is a conventional planetary gear set as would be readily understood by one of ordinary skill in the art and includes a sun gear 222, a plurality of pinion gears 223 and a ring gear 224. The pinion gears 223 are rotatably mounted on the carrier 221. Each planetary gear 223 is continuously meshed with the sun gear 222 and the ring gear 224. The sun gear 222 is non-rotatably coupled by a shaft 203 to electric motor A 291 ("EMA"). The ring gear 224 is non-rotatably coupled to electric motor B 292 ("EMB").

EMB 292 is also non-rotatably coupled to a second clutch mechanism 282 by a shaft 204. A first clutch mechanism 281 selectively non-rotatably couples EMB 292 and shaft 204 to a shaft 205. Shaft 205 is non-rotatably coupled to a first driver gear 211. Shaft 204 is also non-rotatably coupled to a synchronizer mechanism 288. The synchronizer mechanism 288 is longitudinally movable along the shaft 204 and may be moved into contact with a reverse driver gear 213, thereby locking the reverse driver gear 213 to the shaft 204. EMA 292 is non-rotatably coupled to a second clutch mechanism 282. The second clutch mechanism 282 selectively non-rotatably couples EMA 292 to shaft 206. Shaft 206 is non-rotatably coupled to a second driver gear 212.

The MM-EVT also includes an output shaft 236 non-rotatably coupled to a first driven gear 231 continuously meshed with the first driver gear 211, second driven gear 232 continuously meshed with the second driver gear 212, and reverse driven gear 233 continuously meshed with a reverse idler gear 214, which is continuously meshed with the reverse driven gear 213. An output gear 234 is non-rotatably coupled to the output shaft 236. The output gear 234 is continuously meshed with a final drive output 235 that distributes propulsive force from the MM-EVT.

The MM-EVT of FIG. 2 may be configured for operation in several different modes. For operation of the MM-EVT in a first transmission gear ratio with the engine 201 and EMB 292 providing propulsive force and EMA 291 generating electrical power, the first clutch mechanism 281 is activated, the second clutch mechanism 282 is deactivated, and the synchronizer mechanism 288 is kept out of contact with the reverse driver gear 213. To switch the MM-EVT to operate in a second transmission gear ratio from the first transmission gear ratio, the MM-EVT is first switched to operate in a fixed gear state by adjusting the RPM of EMA 291 to match the RPM of shaft 206. Once the RPM of EMA 291 approximates the RPM of shaft 206, the second clutch mechanism 282 is activated in addition to the already activated first clutch mechanism 281, and the synchronizer mechanism 288 is kept out of contact with the reverse driver gear 213. When the MM-EVT enters fixed gear operation from the first transmission gear ratio, the engine 201 and EMB 292 are providing propulsive force while EMA 291 is generating electrical power. To switch to operate in the second transmission gear ratio, EMB 292 is switched to a generating mode and EMA 291 is switched to provide propulsive force. To complete the switch of the MM-EVT into the second transmission gear ratio with the engine 201 and EMA 291 providing propulsive force and EMB 292 generating electrical power, the second clutch mechanism 282 remains activated, the first clutch mechanism 281 is deactivated, and the synchronizer mechanism 288 is kept out of contact with the reverse driver gear 213. To switch the MM-EVT to operate in the first transmission gear ratio from the second transmission gear ratio, the MM-EVT is first switched to operate in a fixed gear state by adjusting the RPM of EMB 292 to match the RPM of shaft 205. Once the RPM of EMB 292 approximates the RPM of shaft 205, the first clutch mechanism 281 is activated in addition to the already activated second clutch mechanism 282, and the synchronizer mechanism 288 is kept out of contact with the reverse driver gear 213. When the MM-EVT enters fixed gear operation from the second transmission gear ratio, the engine 201 and EMA 291 are providing propulsive force while EMB 292 is generating electrical power. To switch to operate in the first transmission gear ratio, EMA 291 is switched to a generating mode and EMB 292 is switched to provide propulsive force. To complete the switch to the first transmission gear ratio, the first clutch mechanism 281 remains activated, the second clutch mechanism 282 is deactivated, and synchronizer mechanism 288 is kept out of contact with the reverse driver gear 213. For operation of the MM-EVT in reverse, the first clutch mechanism 281 and second clutch mechanism 282 are deactivated and the synchronizer mechanism 288 is moved into contact with the reverse driver gear 213, thereby locking the reverse driver gear 213 to shaft 204.

Figure 3:
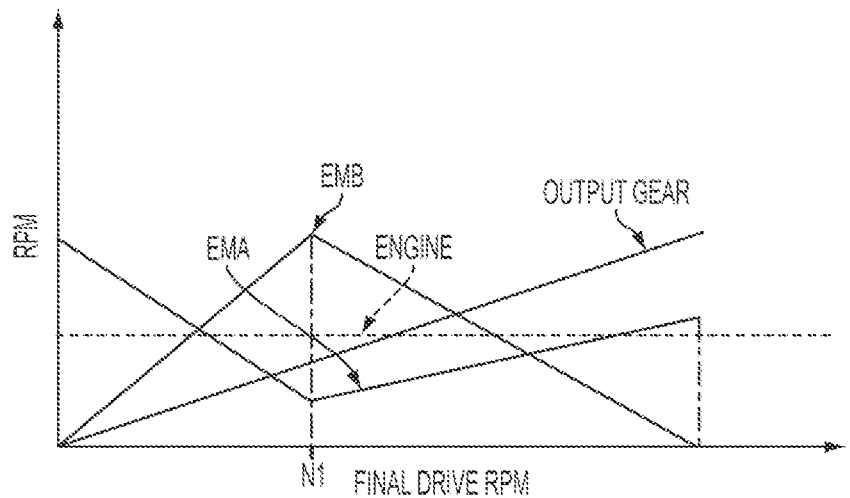
FIG. 3 is a graph showing the rotations per minute of a first electric motor, second electric motor, output driver gear, and the engine of the multi-mode electrically variable transmission of FIG. 2 plotted against the output rotations per minute of the final drive.

FIG. 3 is a graph showing the rotations per minute of a first electric motor ("EMA"), second electric motor ("EMB"), output driver gear ("OUTPUT GEAR"), and the engine ("ENGINE") of the multi-mode electrically variable transmission ("MM-EVT") of FIG. 2 plotted against the output rotations per minute of the final drive. The MM-EVT is operated in the first transmission gear ratio at final drive RPM between zero and N1, the fixed gear mode at final drive RPM equal to N1, and the second transmission gear ratio at final drive RPM greater than N1. Throughout operation, the RPM of the engine remain constant and the RPM of the output driver gear increases proportionally with the increase in the final drive RPM. At final drive RPM between zero and N1, the RPM of the EMB increases proportionally with the increase in the final drive RPM and the RPM of EMA decreases proportionally with the increase in the final drive RPM. At final drive RPM greater than N1, the transmission transitions into the second transmission gear ratio and the RPM of EMB decreases proportionally with the increase in the final drive RPM and the RPM of EMA increases proportionally with the increase in the final drive RPM.

Figure 4:
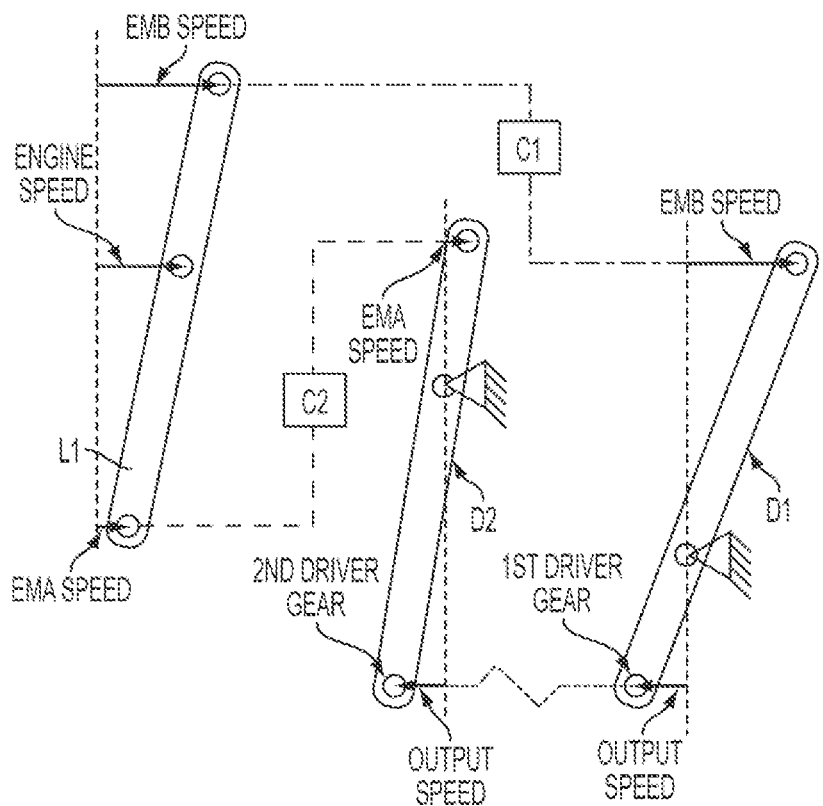
FIG. 4 is a lever diagram of a first electric motor, second electric motor, the engine and output gear of the multi-mode electrically variable transmission of FIG. 2.

FIG. 4 is a lever diagram of a first electric motor ("EMA SPEED" in FIG. 4), second electric motor ("EMB SPEED"), the engine ("ENGINE SPEED") and output gear ("OUTPUT GEAR") of the multi-mode electrically variable transmission ("MM-EVT") of FIG. 2. The lever diagram of FIG. 4 represents the MM-EVT operating in a fixed gear state. Lever L1 represents the input-split planetary gear set 207, lever D1 represents the first transmission gear ratio, and lever D2 represents the second transmission gear ratio. The engine 201 RPM causes EMA 291 to rotate at a first RPM and EMB 292 to rotate at a second RPM. The first clutch mechanism 281 ("C1") couples EMB 292 to the first driver gear 211 on lever D1. The rotation of EMB 292 on lever D1 causes the first driver gear 211 and output gear 234 to rotate at a third RPM. The second clutch mechanism 282 ("C2) couples EMA 291 to the second driver gear 212 on lever D2. The rotation of EMA 291 on lever D2 causes the second driver gear 212 and output gear 234 to rotate at the third RPM. The RPM of the first driver gear 211 on lever D1 and second driver gear 212 on lever D2 are equal to the RPM of the output gear 234 when the MM-EVT is operated in a fixed gear state.

Figure 5:
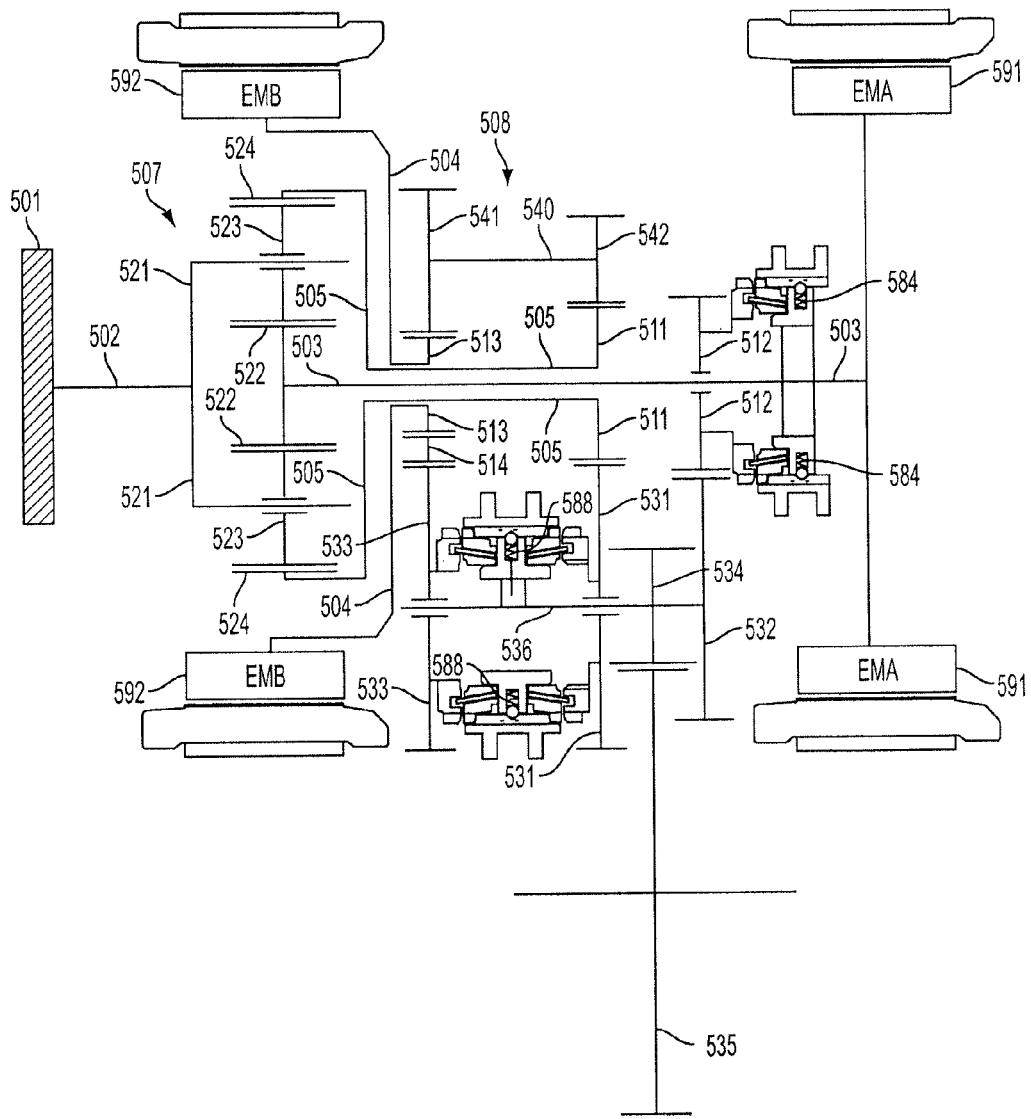
FIG. 5 illustrates an example multi-mode electrically variable transmission having multiple operating modes according to another embodiment disclosed herein.

FIG. 5 illustrates an example multi-mode electrically variable transmission ("MM-EVT") having multiple operating modes according to another embodiment disclosed herein.

The MM-EVT is coupled to an engine 501 by a transmission input shaft 502. The transmission input shaft 502 is also coupled to a carrier 521 of an input-split planetary gear set 507. The input-split planetary gear set 507 is a conventional planetary gear set as would be readily understood by one of ordinary skill in the art and includes a sun gear 522, a plurality of pinion gears 523 and a ring gear 524. The pinion gears 523 are rotatably mounted on the carrier 521. Each planetary gear 523 is continuously meshed with the sun gear 522 and the ring gear 524. The sun gear 522 is non-rotatably coupled by a shaft 503 to electric motor A 591 ("EMA") and a second synchronizer mechanism 584. The second synchronizer mechanism 584 is longitudinally movable along the shaft 503 and may be moved into contact with a second driver gear 512, thereby locking the second driver gear 512 to the shaft 503. The ring gear 524 is non-rotatably coupled to a shaft 505.

A first driver gear 511 is non-rotatably coupled to the shaft 505. The first driver gear 511 is continuously meshed with an EMB layshaft driven gear 542 of an EMB reduction gear set 508. The EMB reduction gear set 508 further includes an EMB layshaft 540 non-rotatably coupled to the EMB layshaft driven gear 542 and an EMB layshaft driver gear 541. The EMB layshaft driver gear 541 is continuously meshed with a reverse driver gear 513. The reverse driver gear 513 is non-rotatably coupled by a shaft 504 to electric motor B 592 ("EMB").

The MM-EVT also includes an output shaft 536 non-rotatably coupled to a first synchronizer mechanism 588, an output gear 534, and a second driven gear 532. The first driven gear 531 and reverse driven gear 533 are rotatably coupled to the output shaft 536. The first synchronizer mechanism 588 is longitudinally movable along the output shaft 536 and may be moved into contact with the first driven gear 531, thereby, locking the first driven gear 531 to the output shaft 536. The first synchronizer mechanism 588 may also be moved into contact with the reverse driven gear 533, thereby, locking the reverse driven gear 533 to the output shaft 536. The first driven gear 531 is continuously meshed with the first driver gear 511, the second driven gear 532 is continuously meshed with the second driver gear 512, and the reverse driven gear 533 continuously meshed with a reverse idler gear 514 which is continuously meshed with the reverse driver gear 513. The output gear 534 is continuously meshed with a final drive output 535 that distributes propulsive force from the MM-EVT.

The MM-EVT of FIG. 5 may be configured for operation in several different modes. For operation of the MM-EVT in a first transmission gear ratio with the engine 501 and EMB 592 providing propulsive force and EMA 591 generating electrical power, the first synchronizer mechanism 588 is moved into contact with the first driven gear 531, thereby locking it to the output shaft 536 and the second synchronizer mechanism 584 is kept out of contact with the second driver gear 512. To switch the MM-EVT to operate in a second transmission gear ratio from the first transmission gear ratio, the MM-EVT is first switched to operate in a fixed gear state by adjusting the RPM of EMA 591 to match the RPM of the second driver gear 512. Once the RPM of EMA 591 approximates the RPM of the second driver gear 512, the second synchronizer mechanism 584 is moved into contact with the second driver gear 512, thereby locking it to shaft the shaft 503, while the first synchronizer mechanism 588 remains in contact with the first driven gear 531. When the MM-EVT enters fixed gear operation from the first transmission gear ratio, the engine 501 and EMB 592 are providing propulsive force while EMA 591 is generating electrical power. To switch to operate in the second transmission gear ratio, EMB 592 is switched to a generating mode and EMA 591 is switched to provide propulsive force. To complete the switch of the MM-EVT into the second transmission gear ratio with the engine 501 and EMA 591 providing propulsive force and EMB 592 generating electrical power, the first synchronizer mechanism 588 is moved out of contact with the first driven gear 531 while the second synchronizer mechanism 584 remains in contact with the second driver gear 512. To switch the MM-EVT to operate in the first transmission gear ratio from the second transmission gear ratio, the MM-EVT is first switched to operate in the fixed gear state by adjusting the RPM of EMB 592 to cause the RPM of the first driven gear 531 to match the RPM of the output shaft 536. Once the RPM of the first driven gear 531 approximates the RPM of the output shaft 536, the first synchronizer mechanism 588 is moved into contact with the first driven gear 531, thereby locking it to the output shaft 536, while the second synchronizer mechanism 584 remains in contact with the second driver gear 512. When the MM-EVT enters fixed gear operation from the second transmission gear ratio, the engine 501 and EMA 591 are providing propulsive force while EMB 592 is generating electrical power. To switch to operate in the first transmission gear ratio, EMA 591 is switched to a generating mode and EMB 592 is switched to provide propulsive force. To complete the switch of the MM-EVT into the first transmission gear ratio with the engine 501 and EMB 592 providing propulsive force and EMA 591 generating electrical power, the second synchronizer mechanism 584 is moved out of contact with the second driver gear 512 while the first synchronizer mechanism 588 remains in contact with the first driven gear 531. For operation of the MM-EVT in reverse, the first synchronizer mechanism 588 is moved into contact with the reverse driven gear 533, thereby locking it to the output shaft 536, and the second synchronizer mechanism 584 is kept out of contact with the second driver gear 512.

Figure 6:
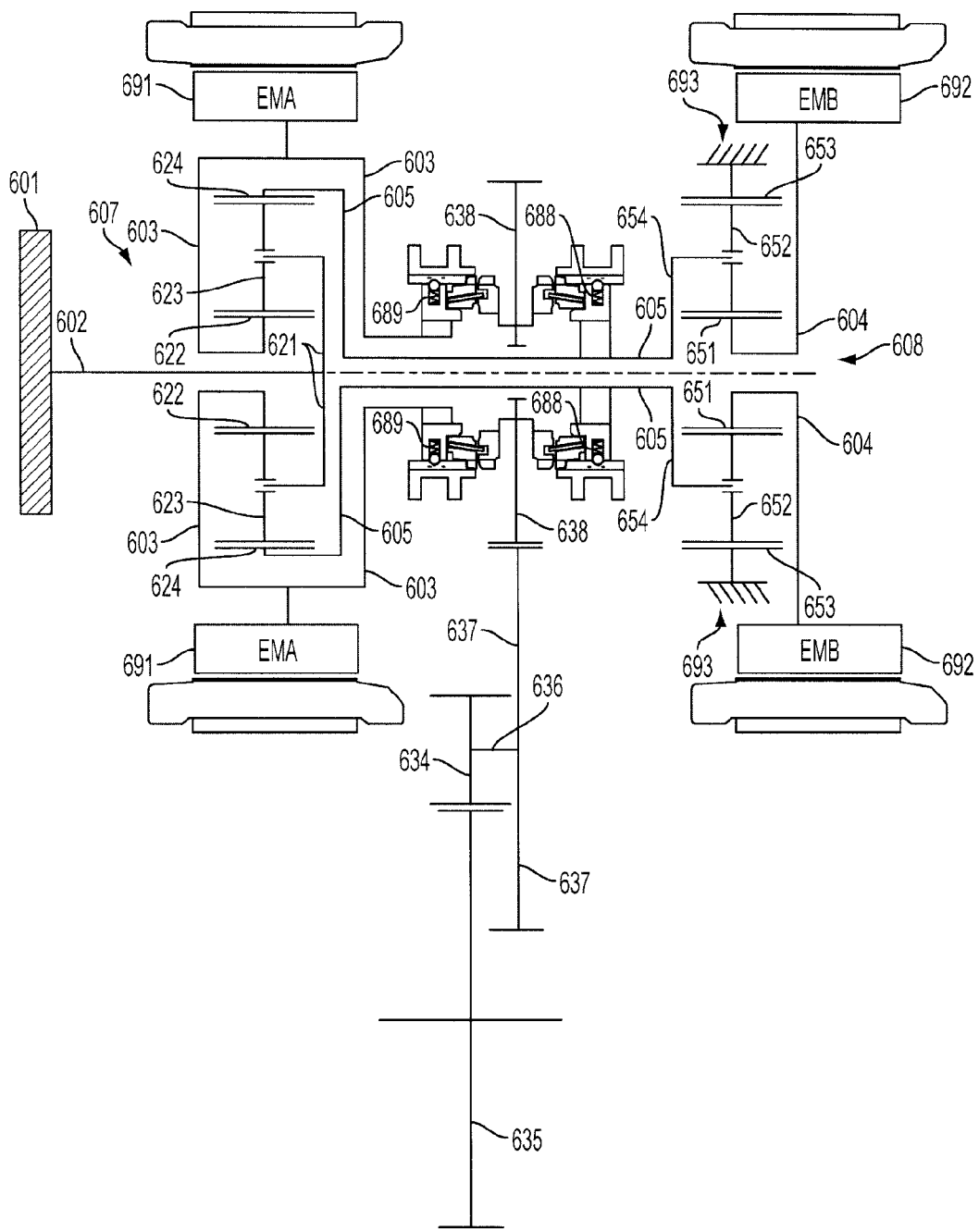
FIG. 6 illustrates an example multi-mode electrically variable transmission having multiple operating modes according to another embodiment disclosed herein.

FIG. 6 illustrates an example multi-mode electrically variable transmission ("MM-EVT") having multiple operating modes according to another embodiment disclosed herein. The MM-EVT is coupled to an engine 601 by a transmission input shaft 602. The transmission input shaft 602 is coupled to a carrier 621 of an input-split planetary gear set 607. The input-split planetary gear set 607 is a conventional planetary gear set as would be readily understood by one of ordinary skill in the art and includes a sun gear 622, a plurality of pinion gears 623 and a ring gear 624. The pinion gears 623 are rotatably mounted on the carrier 621. Each planetary gear 623 is continuously meshed with the sun gear 622 and the ring gear 624. The sun gear 622 is non-rotatably coupled by a shaft 603 to electric motor A 691 ("EMA") and a second synchronizer mechanism 689. The ring gear 624 is non-rotatably coupled by a shaft 605 to an EMB reduction gear set 608 and a first synchronizer mechanism 688.

The EMB reduction gear set 608 includes a planetary gear set having an EMB gear set sun gear 651, EMB gear set pinion gears 652, EMB gear set ring gear 653, and EMB gear set carrier 654. The EMB gear set carrier 654 is non-rotatably coupled to the shaft 605. The planetary gear set is a conventional planetary gear set as would be readily understood by one of ordinary skill in the art. The EMB gear set pinion gears 652 are rotatably mounted on the EMB gear set carrier 654. Each EMB gear set planetary gear 652 is continuously meshed with the EMB gear set sun gear 651 and the EMB gear set ring gear 653. The EMB gear set ring gear 653 is non-rotatably coupled to the transmission housing 693. The EMB gear set sun gear 651 is non-rotatably coupled by a shaft 604 to electric motor B 692 ("EMB").

The first synchronizer mechanism 688 is longitudinally movable along the shaft 605 and may be moved into contact with an output driver gear 638, thereby locking the output driver gear 638 to the shaft 605. The second synchronizer mechanism 689 is longitudinally movable along the shaft 603 and may be moved into contact with the output driver gear 638, thereby locking the output driver gear 638 to the shaft 603. The output driver gear 638 is continuously meshed with an output driven gear 637 non-rotatably coupled to an output layshaft 636. An output gear 634 is also non-rotatably coupled to the output layshaft 636. The output gear 634 is continuously meshed with a final drive output 635 that distributes propulsive force from the MM-EVT.

The MM-EVT of FIG. 6 may be configured for operation in several different modes. For operation of the MM-EVT in a first transmission gear ratio with the engine 601 and EMB 692 providing propulsive force and EMA 691 generating electrical power, the first synchronizer mechanism 688 is moved into contact with the output driver gear 638, thereby locking it to the shaft 605. To switch the MM-EVT to operate in a second transmission gear ratio from the first transmission gear ratio, the MM-EVT is first switched to operate in a fixed gear state by adjusting the RPM of EMA 691 to match the RPM of the output driver gear 638. Once the RPM of EMA 691 approximates the RPM of the output driver gear 638, the second synchronizer mechanism 689 is moved into contact with the output driver gear 638, thereby locking it to shaft the shaft 603, while the first synchronizer mechanism 688 remains in contact with the output driver gear 638. When the MM-EVT enters fixed gear operation from the first transmission gear ratio, the engine 601 and EMB 692 are providing propulsive force while EMA 691 is generating electrical power. To switch to operate in the second transmission gear ratio, EMB 692 is switched to a generating mode and EMA 691 is switched to provide propulsive force. To complete the switch of the MM-EVT into the second transmission gear ratio with the engine 601 and EMA 691 providing propulsive force and EMB 692 generating electrical power, the first synchronizer mechanism 688 is moved out of contact with the output driver gear 638 while the second synchronizer mechanism 689 remains in contact with the output driver gear 638. To switch the MM-EVT to operate in the first transmission gear ratio from the second transmission gear ratio, the MM-EVT is first switched to operate in the fixed gear state by adjusting the RPM of EMB 692 to cause the RPM of the shaft 605 to match the RPM of the output driver gear 638. Once the RPM of the shaft 605 approximates the RPM of the output driver gear 638, the first synchronizer mechanism 688 is moved into contact with the output driver gear 638, thereby locking it to shaft 605, while the second synchronizer mechanism 689 remains in contact with the output driver gear 638. When the MM-EVT enters fixed gear operation from the second transmission gear ratio, the engine 601 and EMA 691 are providing propulsive force while EMB 692 is generating electrical power. To switch to operate in the first transmission gear ratio, EMA 691 is switched to a generating mode and EMB 692 is switched to provide propulsive force. To complete the switch of the MM-EVT into the first transmission gear ratio with the engine 601 and EMB 692 providing propulsive force and EMA 691 generating electrical power, the second synchronizer mechanism 689 is moved out of contact with the output driver gear 638 while the first synchronizer mechanism 688 remains in contact with the output driver gear 638.

Figure 7:
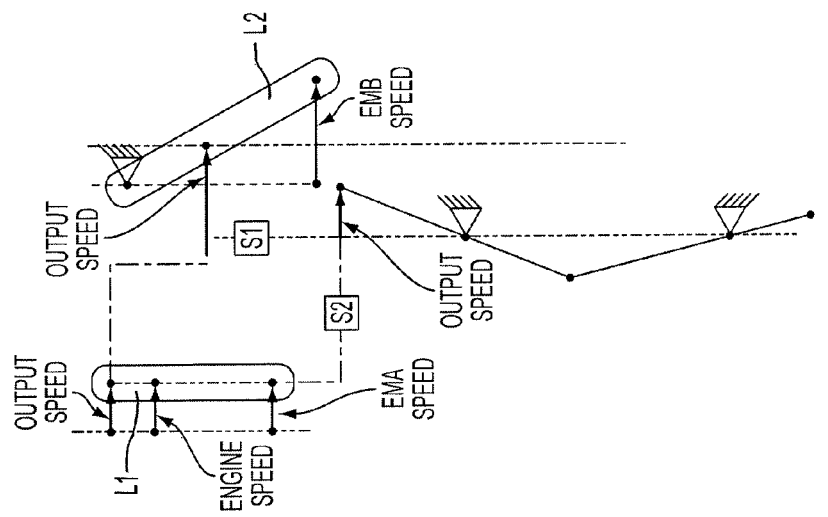
FIG. 7 is a lever diagram of a first electric motor, second electric motor, the engine and output driver gear of the multi-mode electrically variable transmission of FIG. 6.

FIG. 7 is a lever diagram of the first electric motor ("EMA SPEED"), second electric motor ("EMB SPEED"), the engine ("ENGINE SPEED") and output driver gear ("OUTPUT GEAR") of the multi-mode electrically variable transmission ("MM-EVT") of FIG. 6. The lever diagram of FIG. 7 represents the MM-EVT operating in a fixed gear state. The lever L1 represents the input-split planetary gear set 607 and the lever L2 represents the EMB reduction gear set 608. Referring to the lever L1, the engine 601 RPM causes EMA 691 and the output driver gear 638 to all rotate at a first RPM. Referring to the lever L2, the EMB gear set ring gear 653 is fixed to the transmission housing 693 and EMB 692 is coupled to the sun gear 651 and rotates at a second RPM. The EMB gear set carrier 654 is coupled to the output driver gear 638 and causes the output driver gear 638 to rotate at the first RPM.

Figure 8:
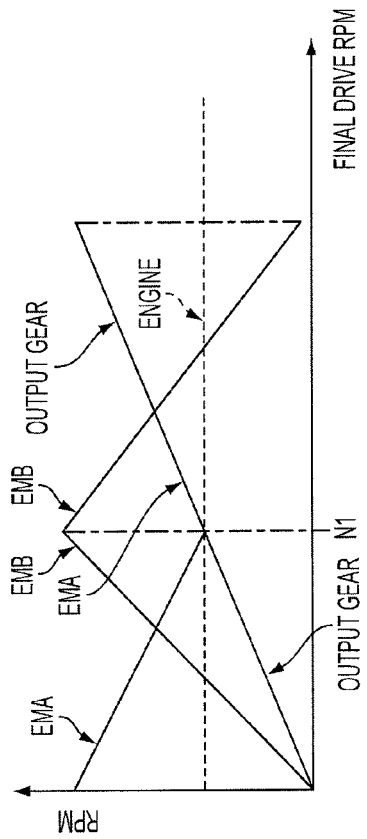
FIG. 8 is a graph showing the rotations per minute of a first electric motor, second electric motor, output driver gear, and the engine of the multi-mode electrically variable transmission of FIG. 6 plotted against the output rotations per minute of the final drive.

FIG. 8 is a graph showing the rotations per minute of the first electric motor ("EMA"), second electric motor ("EMB"), output driver gear ("OUTPUT GEAR"), and the engine ("ENGINE") of the multi-mode electrically variable transmission ("MM-EVT") of FIG. 6 plotted against the output rotations per minute of the final drive. The MM-EVT is operated in the first transmission gear ratio at final drive RPM between zero and N1, the fixed gear mode at final drive RPM equal to N1, and the second transmission gear ratio at final drive RPM greater than N1. Throughout operation, the RPM of the engine remain constant and the RPM of the output driver gear increases proportionally with the increase in the final drive RPM. At final drive RPM between zero and N1, the RPM of EMB increases proportionally with the increase in the final drive RPM and the RPM of EMA decreases proportionally with the increase in the final drive RPM. At final drive RPM greater than N1, the transmission transitions into the second transmission gear ratio and the RPM of EMB decreases proportionally with the increase in the final drive RPM and the RPM of EMA increases proportionally with the increase in the final drive RPM. In addition, at final drive RPM greater than N1, the RPM of the output driver gear equals the RPM of EMA.

Figure 9:
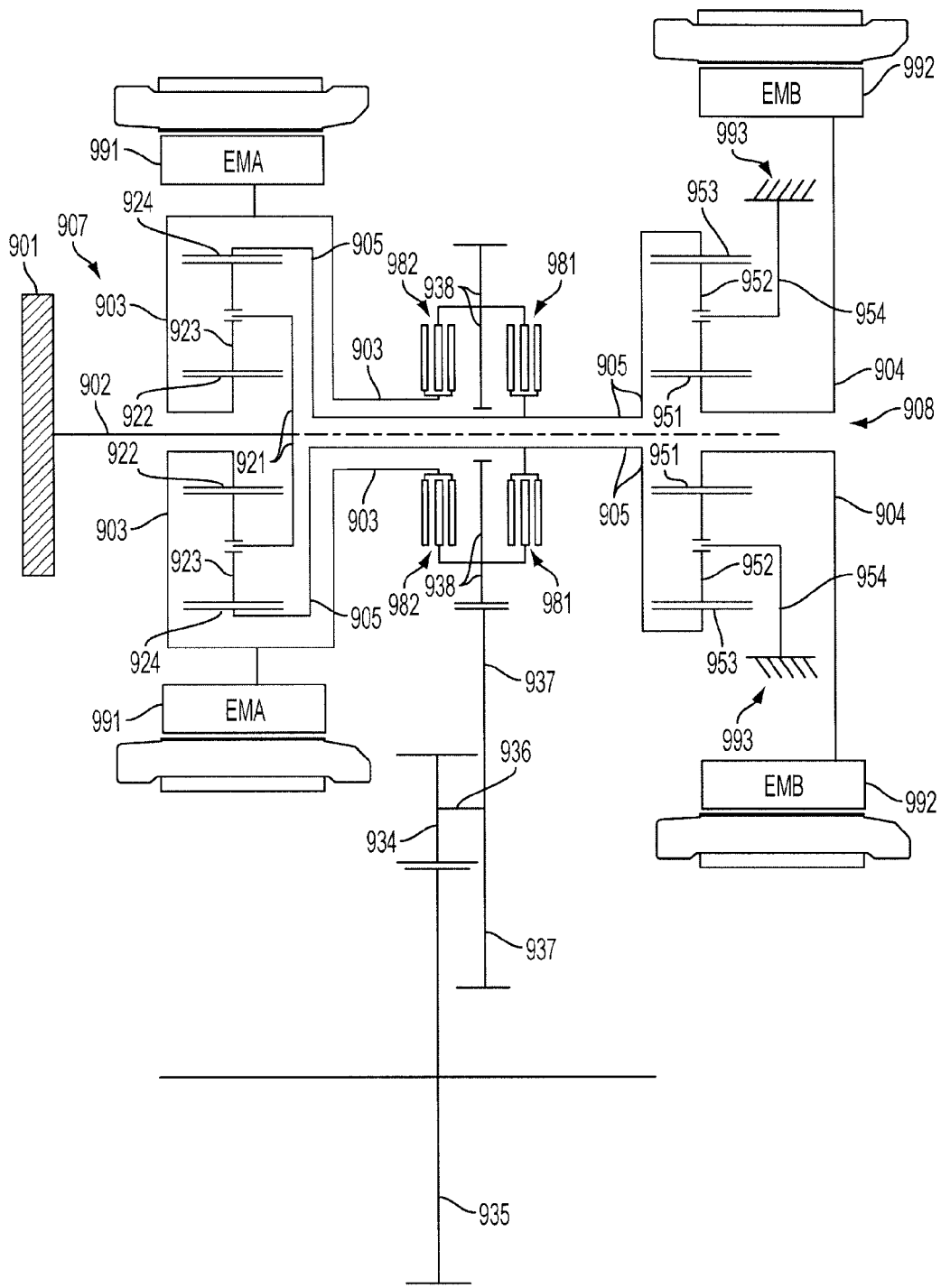
FIG. 9 illustrates an example multi-mode electrically variable transmission having multiple operating modes according to another embodiment disclosed herein.

FIG. 9 illustrates an example multi-mode electrically variable transmission ("MM-EVT") having multiple operating modes according to another embodiment disclosed herein. The MM-EVT is coupled to an engine 901 by a transmission input shaft 902. The transmission input shaft 902 is also coupled to a carrier 921 of an input-split planetary gear set 907. The input-split planetary gear set 907 is a conventional planetary gear set as would be readily understood by one of ordinary skill in the art and includes a sun gear 922, a plurality of pinion gears 923 and a ring gear 924. The pinion gears 923 are rotatably mounted on the carrier 921. Each planetary gear 923 is continuously meshed with the sun gear 922 and the ring gear 924. The sun gear 922 is non-rotatably coupled by a shaft 903 to electric motor A 991 ("EMA") and a second clutch mechanism 982. The ring gear 924 is non-rotatably coupled by a shaft 905 to an EMB reduction gear set 908 and a first clutch mechanism 981.

The EMB reduction gear set 908 includes a planetary gear set having an EMB gear set sun gear 951, EMB gear set pinion gears 952, EMB gear set ring gear 953, and EMB gear set carrier 954. The EMB gear set ring gear 953 is non-rotatably coupled to the shaft 905. The planetary gear set is a conventional planetary gear set as would be readily understood by one of ordinary skill in the art. The EMB gear set pinion gears 952 are rotatably mounted on the EMB gear set carrier 954. Each EMB gear set planetary gear 952 is continuously meshed with the EMB gear set sun gear 951 and the EMB gear set ring gear 953. The EMB gear set carrier 954 is non-rotatably coupled to the transmission housing 993. The EMB gear set sun gear 951 is non-rotatably coupled by a shaft 904 to electric motor B 992 ("EMB").

The first clutch mechanism 981 selectively couples an output driver gear 938 to shaft 905 and the second clutch mechanism 982 selectively couples the output driver gear 938 to shaft 903. The output driver gear 938 is continuously meshed with an output driven gear 937 non-rotatably coupled to an output layshaft 936. An output gear 934 is also non-rotatably coupled to the output layshaft 936. The output gear 934 is continuously meshed with a final drive output 935 that distributes propulsive force from the MM-EVT.

The MM-EVT of FIG. 9 may be configured for operation in several different modes. For operation of the MM-EVT in a first transmission gear ratio with the engine 901 and EMB 992 providing propulsive force and EMA 991 generating electrical power, the first clutch mechanism 981 is activated and the second clutch mechanism 982 is deactivated. To switch the MM-EVT to operate in a second transmission gear ratio from the first transmission gear ratio, the MM-EVT is first switched to operate in a fixed gear state by adjusting the RPM of EMA 991 to match the RPM of the output driver gear 938. Once the RPM of EMA 991 approximates the RPM of the output driver gear 938, the second clutch mechanism 982 is activated and in addition to the already activated first clutch mechanism 981. When the MM-EVT enters fixed gear operation from the first transmission gear ratio, the engine 901 and EMB 992 are providing propulsive force while EMA 991 is generating electrical power. To switch to operate in the second transmission gear ratio, EMB 992 is switched to a generating mode and EMA 991 is switched to provide propulsive force. To complete the switch of the MM-EVT into the second transmission gear ratio with the engine 901 and EMA 991 providing propulsive force and EMB 992 generating electrical power, the first clutch mechanism 981 is deactivated while the second clutch mechanism 982 remains activated. To switch the MM-EVT to operate in the first transmission gear ratio from the second transmission gear ratio, the MM-EVT is first switched to operate in the fixed gear state by adjusting the RPM of EMB 992 to cause the RPM of the shaft 905 to match the RPM of the output driver gear 938. Once the RPM of the shaft 905 approximates the RPM of the output driver gear 938, the first clutch mechanism 981 is activated in addition to the already activated second clutch mechanism 982. When the MM-EVT enters fixed gear operation from the second transmission gear ratio, the engine 901 and EMA 991 are providing propulsive force while EMB 992 is generating electrical power. To switch to operate in the first transmission gear ratio, EMA 991 is switched to a generating mode and EMB 992 is switched to provide propulsive force. To complete the switch of the MM-EVT into the first transmission gear ratio with the engine 901 and EMB 992 providing propulsive force and EMA 991 generating electrical power, the second clutch mechanism 982 is deactivated while the first clutch mechanism 981 remains activated.

Figure 10:
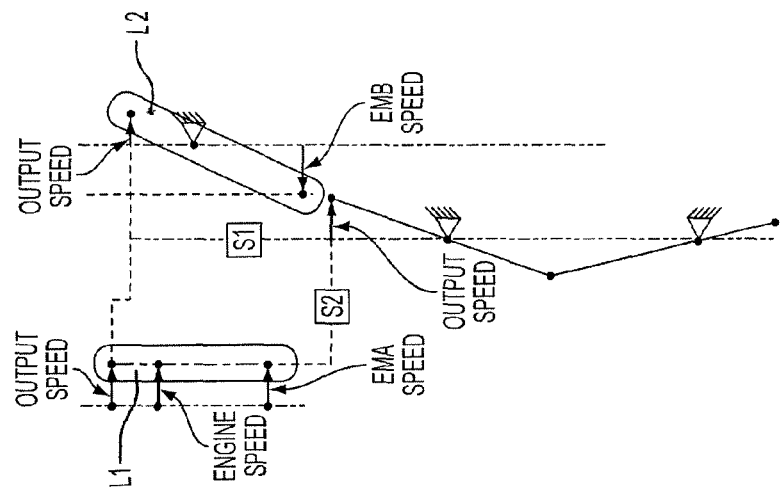
FIG. 10 is a lever diagram of a first electric motor, second electric motor, the engine and output driver gear of the multi-mode electrically variable transmission of FIG. 9.

FIG. 10 is a lever diagram of the first electric motor ("EMA SPEED"), second electric motor ("EMB SPEED"), the engine ("ENGINE SPEED") and output driver gear ("OUTPUT GEAR") of the multi-mode electrically variable transmission ("MM-EVT") of FIG. 9. The lever diagram of FIG. 10 represents the MM-EVT operating in a fixed gear state. Lever L1 represents the input-split planetary gear set 907 and lever L2 represents the EMB reduction gear set 908. Referring to lever L1, the engine 901 RPM causes EMA 991 and the output driver gear 938 to all rotate at a first RPM. Referring to lever L2, the EMB gear set carrier 954 of L2 is fixed to the transmission housing 993 and EMB 992 is coupled to the sun gear 951 and rotates at a second RPM. The EMB gear set ring gear 953 is coupled to the output driver gear 938 and causes the output driver gear 938 to rotate at the first RPM.

Figure 11:
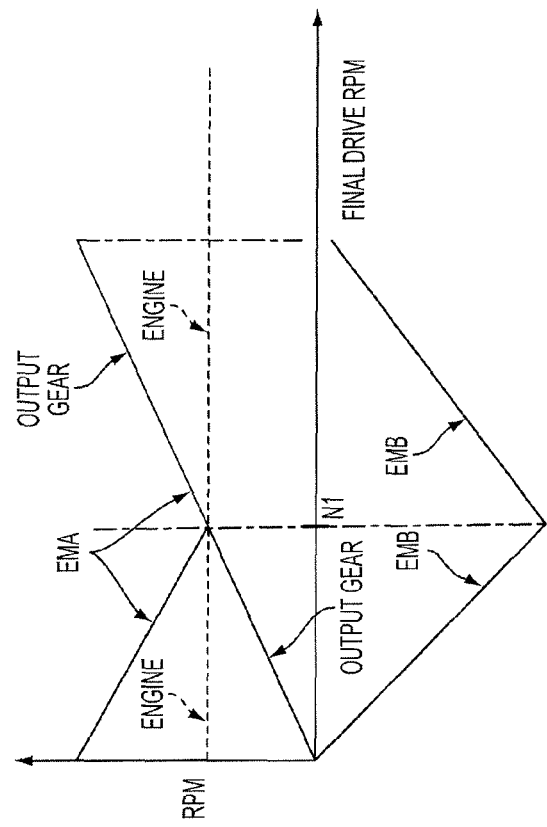
FIG. 11 is a graph showing the rotations per minute of a first electric motor, second electric motor, output driver gear, and the engine of the multi-mode electrically variable transmission of FIG. 9 plotted against the output rotations per minute of the final drive.

FIG. 11 is a graph showing the rotations per minute of a first electric motor ("EMA"), second electric motor ("EMB"), output driver gear ("OUTPUT GEAR"), and the engine ("ENGINE") of the multi-mode electrically variable transmission ("MM-EVT") of FIG. 9 plotted against the output rotations per minute of the final drive. The MM-EVT is operated in the first transmission gear ratio at final drive RPM between zero and N1, the fixed gear mode at final drive RPM equal to N1, and the second transmission gear ratio at final drive RPM greater than N1. Throughout operation, the RPM of the engine remain constant and the RPM of the output driver gear increases proportionally with the increase in the final drive RPM. At final drive RPM between zero and N1, the RPM of EMB becomes increasingly negative proportionally with the increase in the final drive RPM and the RPM of EMA decreases proportionally with the increase in the final drive RPM. At final drive RPM greater than N1, the transmission transitions into the second transmission gear ratio and the RPM of EMB becomes decreasingly negative proportionally with the increase in the final drive RPM and the RPM of EMA increases proportionally with the increase in the final drive RPM. In addition, at final drive RPM greater than N1, the RPM of the output driver gear equals the RPM of EMA.

Figure 12:
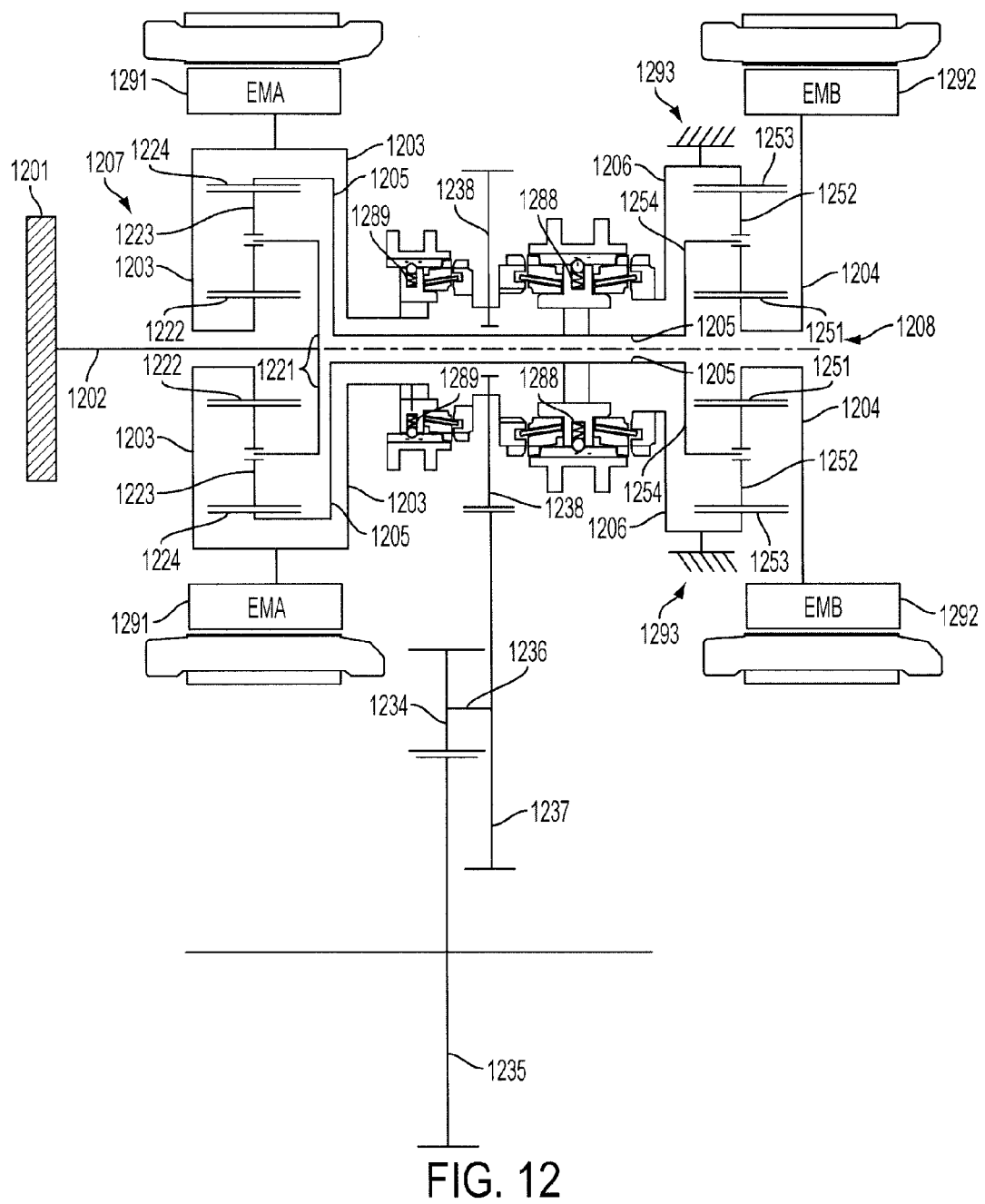
FIG. 12 illustrates an example multi-mode electrically variable transmission having multiple operating modes according to another embodiment disclosed herein.

FIG. 12 illustrates an example multi-mode electrically variable transmission ("MM-EVT") having multiple operating modes according to another embodiment disclosed herein. The MM-EVT is coupled to an engine 1201 by a transmission input shaft 1202. The transmission input shaft 1202 is also coupled to a carrier 1221 of an input-split planetary gear set 1207. The input-split planetary gear set 1207 is a conventional planetary gear set as would be readily understood by one of ordinary skill in the art and includes a sun gear 1222, a plurality of pinion gears 1223 and a ring gear 1224. The pinion gears 1223 are rotatably mounted on the carrier 1221. Each planetary gear 1223 is continuously meshed with the sun gear 1222 and the ring gear 1224. The sun gear 1222 is non-rotatably coupled by a shaft 1203 to electric motor A 1291 ("EMA") and a second synchronizer mechanism 1289. The ring gear 1224 is non-rotatably coupled by a shaft 1205 to an EMB reduction gear set 1208 and a first synchronizer mechanism 1288.

The EMB reduction gear set 1208 includes a planetary gear set having an EMB gear set sun gear 1251, EMB gear set pinion gears 1252, EMB gear set ring gear 1253, and EMB gear set carrier 1254. The EMB gear set carrier 1254 is non-rotatably coupled to the shaft 1205. The planetary gear set is a conventional planetary gear set as would be readily understood by one of ordinary skill in the art. The EMB gear set pinion gears 1252 are rotatably mounted on the EMB gear set carrier 1254. Each EMB gear set planetary gear 1252 is continuously meshed with the EMB gear set sun gear 1251 and the EMB gear set ring gear 1253. The EMB gear set ring gear 1253 is non-rotatably coupled to the transmission housing 1293 and a shaft 1206. The EMB gear set sun gear 1251 is non-rotatably coupled by a shaft 1204 to electric motor B 1292 ("EMB").

The first synchronizer mechanism 1288 is longitudinally movable along the shaft 1205 and may be moved into contact with an output driver gear 1238, thereby locking a output driver gear 1238 to the shaft 1205. The first synchronizer mechanism 1288 may also be moved into contact with shaft 1206, thereby locking the first synchronizer mechanism 1288 and shaft 1205 to the transmission housing 1293 to improve the operational efficiency of the MM-EVT. The second synchronizer mechanism 1289 is longitudinally movable along the shaft 1203 and may be moved into contact with the output driver gear 1238, thereby locking the output driver gear 1238 to the shaft 1203. The output driver gear 1238 is continuously meshed with an output driven gear 1237 non-rotatably coupled to an output layshaft 1236. An output gear 1234 is also non-rotatably coupled to the output layshaft 1236. The output gear 1234 is continuously meshed with a final drive output 1235 that distributes propulsive force from the MM-EVT.

The MM-EVT of FIG. 12 may be configured for operation in several different modes. For operation of the MM-EVT in a first transmission gear ratio with the engine 1201 and EMB 1292 providing propulsive force and EMA 1291 generating electrical power, the first synchronizer mechanism 1288 is moved into contact with the output driver gear 1238, thereby locking it to shaft 1205. To switch the MM-EVT to operate in a second transmission gear ratio from the first transmission gear ratio, the MM-EVT is first switched to operate in a fixed gear state by adjusting the RPM of EMA 1291 to match the RPM of the output driver gear 1238. Once the RPM of EMA 1291 approximates the RPM of the output driver gear 1238, the second synchronizer mechanism 1289 is moved into contact with the output driver gear 1238, thereby locking the output driver gear 1238 to shaft 1203, while the first synchronizer mechanism 1288 remains in contact with the output driver gear 1238. When the MM-EVT enters fixed gear operation from the first transmission gear ratio, the engine 1201 and EMB 1292 are providing propulsive force while EMA 1291 is generating electrical power. To switch to operate in the second transmission gear ratio, EMB 1292 is switched to a generating mode and EMA 1291 is switched to provide propulsive force. To complete the switch of the MM-EVT into the second transmission gear ratio with the engine 1201 and EMA 1291 providing propulsive force and EMB 1292 generating electrical power, the first synchronizer mechanism 1288 is moved out of contact with the output driver gear 1238 while the second synchronizer mechanism 1289 remains in contact with the output driver gear 1238. To switch the MM-EVT to operate in the first transmission gear ratio from the second transmission gear ratio, the MM-EVT is first switched to operate in the fixed gear state by adjusting the RPM of EMB 1292 to cause the RPM of the shaft 1205 to match the RPM of the output driver gear 1238. Once the RPM of the shaft 1205 approximates the RPM of the output driver gear 1238, the first synchronizer mechanism 1288 is moved into contact with the output driver gear 1238, thereby locking the output driver gear 1238 to shaft 1205, while the second synchronizer mechanism 1289 remains in contact with the output driver gear 1238. When the MM-EVT enters fixed gear operation from the second transmission gear ratio, the engine 1201 and EMA 1291 are providing propulsive force while EMB 1292 is generating electrical power. To switch to operate in the first transmission gear ratio, EMA 1291 is switched to a generating mode and EMB 1292 is switched to provide propulsive force. To complete the switch of the MM-EVT into the first transmission gear ratio with the engine 1201 and EMB 1292 providing propulsive force and EMA 1291 generating electrical power, the second synchronizer mechanism 1289 is moved out of contact with the output driver gear 1238 while the first synchronizer mechanism 1288 remains in contact with the output driver gear 1238. For operation of the MM-EVT with EMB 1292 grounded, the first synchronizer mechanism 1288 is moved into contact with shaft 1206, thereby locking shaft 1206 and EMB 1292 to the transmission housing 1293.

Figure 13:
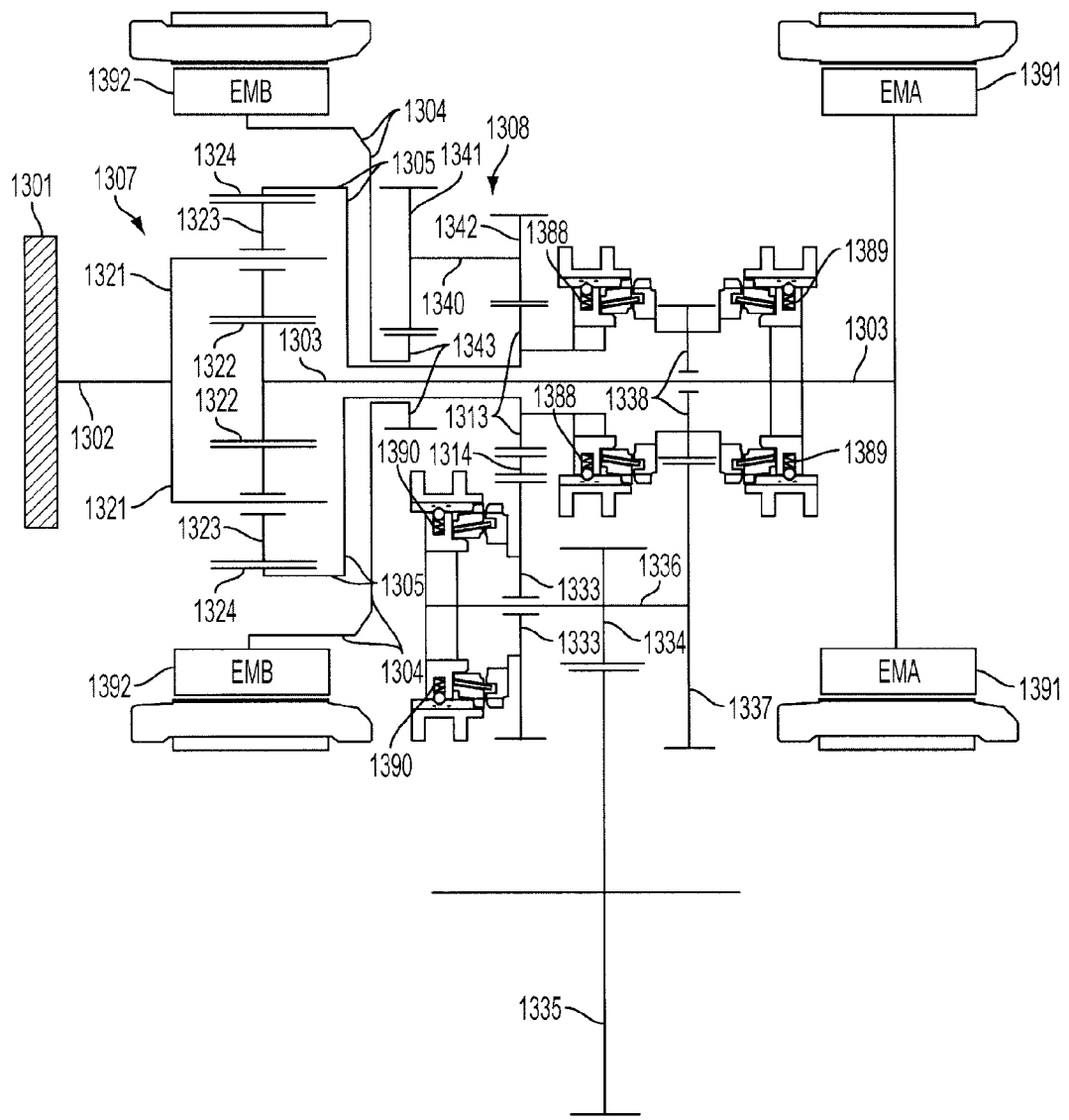
FIG. 13 illustrates an example multi-mode electrically variable transmission having multiple operating modes according to another embodiment disclosed herein.

FIG. 13 illustrates an example multi-mode electrically variable transmission ("MM-EVT") having multiple operating modes according to another embodiment disclosed herein. The MM-EVT is coupled to an engine 1301 by a transmission input shaft 1302. The transmission input shaft 1302 is also coupled to a carrier 1321 of an input-split planetary gear set 1307. The input-split planetary gear set 1307 is a conventional planetary gear set as would be readily understood by one of ordinary skill in the art and includes a sun gear 1322, a plurality of pinion gears 1323 and a ring gear 1324. The pinion gears 1323 are rotatably mounted on the carrier 1321. Each planetary gear 1323 is continuously meshed with the sun gear 1322 and the ring gear 1324. The sun gear 1322 is non-rotatably coupled by a shaft 1303 to electric motor A 1391 ("EMA") and a second synchronizer mechanism 1389. The ring gear 1324 is non-rotatably coupled to a shaft 1305.

Shaft 1305 is non-rotatably coupled to a reverse driver gear 1313 and a first synchronizer mechanism 1388. The reverse driver gear 1313 is continuously meshed with an EMB layshaft driven gear 1342 of an EMB reduction gear set 1308. The EMB reduction gear set 1308 further includes an EMB layshaft 1340 non-rotatably coupled to the EMB layshaft driven gear 1342 and an EMB layshaft driver gear 1341. The EMB layshaft driver gear 1341 is continuously meshed with an EMB driven gear 1343. The EMB driven gear 1343 is non-rotatably coupled by a shaft 1304 to EMB 1392.

The first synchronizer mechanism 1388 is longitudinally movable along the shaft 1305 and may be moved into contact with an output driver gear 1338, thereby locking the output driver gear 1338 to the shaft 1305. The second synchronizer mechanism 1389 is longitudinally movable along the shaft 1303 and may be moved into contact with the output driver gear 1338, thereby locking the output driver gear 1338 to the shaft 1303. The output driver gear 1338 is continuously meshed with an output driven gear 1337 non-rotatably coupled to an output layshaft 1336. An output gear 1334 and third synchronizer mechanism 1390 are also non-rotatably coupled to the output layshaft 1336. A reverse driven gear 1333 is rotatably coupled to the output layshaft 1336. The reverse driven gear 1333 is continuously meshed with a reverse idler gear 1314 which is continuously meshed with the reverse driver gear 1313. The third synchronizer mechanism 1390 is longitudinally movable along the output layshaft 1336 and may be moved into contact with the reverse driven gear 1333, thereby locking the reverse driven gear 1333 to the output layshaft 1336. The output gear 1334 is continuously meshed with a final drive output 1335 that distributes propulsive force from the MM-EVT.

The MM-EVT of FIG. 13 may be configured for operation in several different modes. For operation of the MM-EVT in a first transmission gear ratio with the engine 1301 and EMB 1392 providing propulsive force and EMA 1391 generating electrical power, the first synchronizer mechanism 1388 is moved into contact with the output driver gear 1338, the second synchronizer mechanism 1389 is kept out of contact with the output driver gear 1338, and the third synchronizer mechanism 1390 is kept out of contact with the reverse driven gear 1333. To switch the MM-EVT to operate in a second transmission gear ratio from the first transmission gear ratio, the MM-EVT is first switched to operate in a fixed gear state by adjusting the RPM of EMA 1391 to match the RPM of the output driver gear 1338. Once the RPM of EMA 1391 approximates the RPM of the output driver gear 1338, the second synchronizer mechanism 1389 is moved into contact with the output driver gear 1338, thereby locking it to shaft 1303, while the first synchronizer mechanism 1388 remains in contact with the output driver gear 1338. When the MM-EVT enters fixed gear operation from the first transmission gear ratio, the engine 1301 and EMB 1392 are providing propulsive force while EMA 1391 is generating electrical power. To switch to operate in the second transmission gear ratio, EMB 1392 is switched to a generating mode and EMA 1391 is switched to provide propulsive force. To complete the switch of the MM-EVT into the second transmission gear ratio with the engine 1301 and EMA 1391 providing propulsive force and EMB 1392 generating electrical power, the first synchronizer mechanism 1388 is moved out of contact with the output driver gear 1338 while the second synchronizer mechanism 1389 remains in contact with the output driver gear 1338. To switch the MM-EVT to operate in the first transmission gear ratio from the second transmission gear ratio, the MM-EVT is first switched to operate in the fixed gear state by adjusting the RPM of EMB 1392 to cause the RPM of shaft 1305 to match the RPM of the output driver gear 1338. Once the RPM of shaft 1305 approximates the RPM of the output driver gear 1338, the first synchronizer mechanism 1388 is moved into contact with the output driver gear 1338, thereby locking it to shaft 1305, while the second synchronizer mechanism 1389 remains in contact with the output driver gear 1338. When the MM-EVT enters fixed gear operation from the second transmission gear ratio, the engine 1301 and EMA 1391 are providing propulsive force while EMB 1392 is generating electrical power. To switch to operate in the first transmission gear ratio, EMA 1391 is switched to a generating mode and EMB 1392 is switched to provide propulsive force. To complete the switch of the MM-EVT into the first transmission gear ratio with the engine 1301 and EMB 1392 providing propulsive force and EMA 1391 generating electrical power, the second synchronizer mechanism 1389 is moved out of contact with the output driver gear 1338 while the first synchronizer mechanism 1388 remains in contact with the output driver gear 1338. For operation of the MM-EVT in reverse, the first synchronizer mechanism 1388 and second synchronizer mechanism 1389 remain out of contact with the output driver gear 1338 while the third synchronizer mechanism 1390 is moved into contact with the reverse driven gear 1333, thereby locking the reverse driven gear 1333 to the output shaft 1336.

Figure 14:
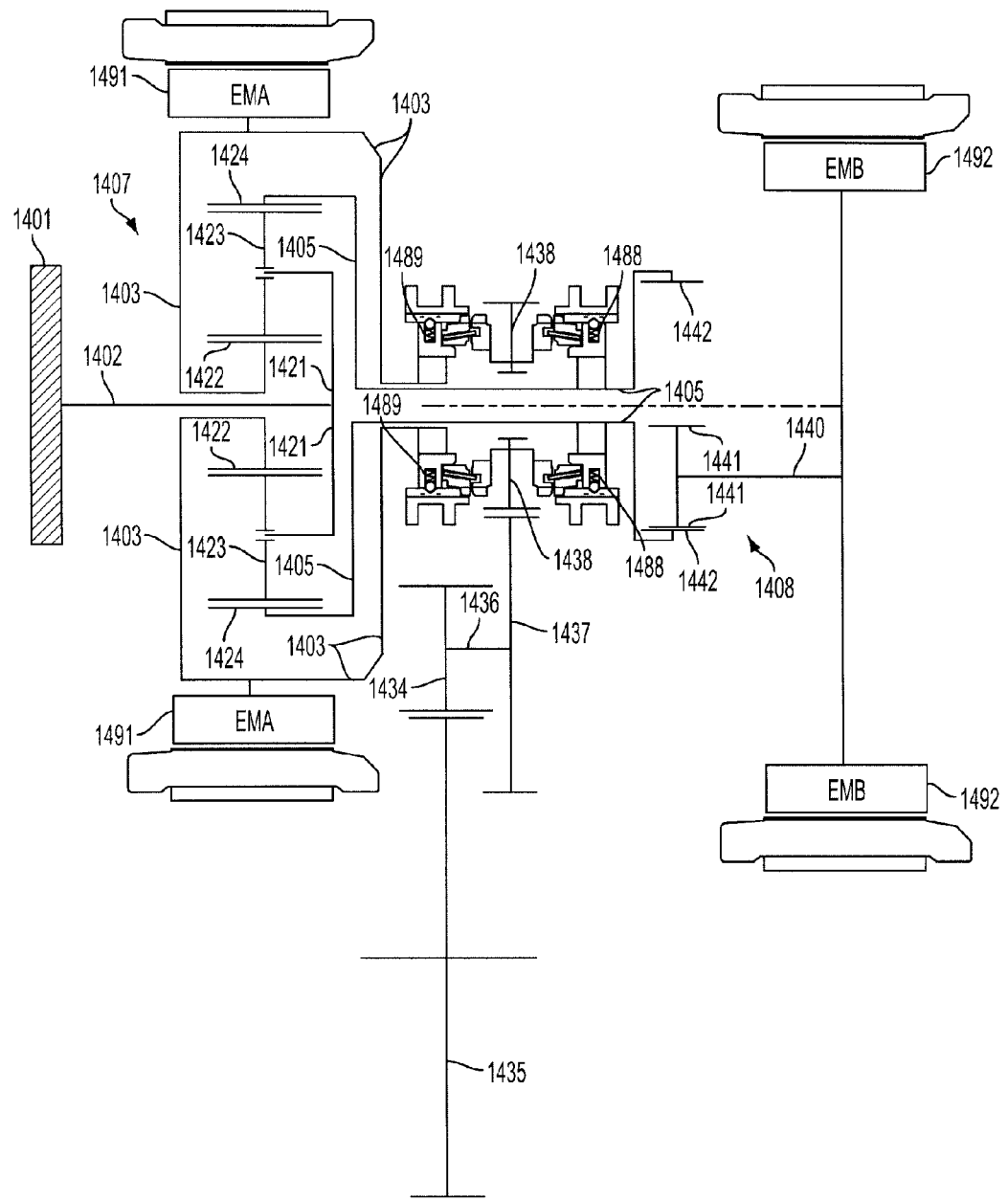
FIG. 14 illustrates an example multi-mode electrically variable transmission having multiple operating modes according to another embodiment disclosed herein.

FIG. 14 illustrates an example multi-mode electrically variable transmission ("MM-EVT") having multiple operating modes according to another embodiment disclosed herein. The MM-EVT is coupled to an engine 1401 by a transmission input shaft 1402. The transmission input shaft 1402 is also coupled to a carrier 1421 of an input-split planetary gear set 1407. The input-split planetary gear set 1407 is a conventional planetary gear set as would be readily understood by one of ordinary skill in the art and includes a sun gear 1422, a plurality of pinion gears 1423 and a ring gear 1424. The pinion gears 1423 are rotatably mounted on the carrier 1421. Each planetary gear 1423 is continuously meshed with the sun gear 1422 and the ring gear 1424. The sun gear 1422 is non-rotatably coupled by a shaft 1403 to electric motor A 1491 ("EMA") and a second synchronizer mechanism 1489. The ring gear 1424 is non-rotatably coupled by a shaft 1405 to an EMB reduction gear set 1408 and a first synchronizer mechanism 1488.

The EMB reduction gear set 1408 includes an EMB layshaft driven gear 1442 non-rotatably coupled to the shaft 1405. The EMB layshaft driven gear 1442 is continuously meshed with an EMB layshaft driver gear 1441 non-rotatably coupled to an EMB layshaft 1440. The EMB layshaft 1440 is non-rotatably coupled to electric motor B 1492 ("EMB").

The first synchronizer mechanism 1488 is longitudinally movable along the shaft 1405 and may be moved into contact with an output driver gear 1438, thereby locking the output driver gear 1438 to the shaft 1405. The second synchronizer mechanism 1489 is longitudinally movable along the shaft 1403 and may be moved into contact with the output driver gear 1438, thereby locking the output driver gear 1438 to the shaft 1403. The output driver gear 1438 is continuously meshed with an output driven gear 1437 non-rotatably coupled to an output layshaft 1436. An output gear 1434 is also non-rotatably coupled to the output layshaft 1436. The output gear 1434 is continuously meshed with a final drive output 1435 that distributes propulsive force from the MM-EVT.

The MM-EVT of FIG. 14 may be configured for operation in several different modes. For operation of the MM-EVT in a first transmission gear ratio with the engine 1401 and EMB 1492 providing propulsive force and EMA 1491 generating electrical power, the first synchronizer mechanism 1488 is moved into contact with the output driver gear 1438, thereby locking it to shaft 1405. To switch the MM-EVT to operate in a second transmission gear ratio from the first transmission gear ratio, the MM-EVT is first switched to operate in a fixed gear state by adjusting the RPM of EMA 1491 to match the RPM of the output driver gear 1438. Once the RPM of EMA 1491 approximates the RPM of the output driver gear 1438, the second synchronizer mechanism 1489 is moved into contact with the output driver gear 1438, thereby locking it to shaft 1403, while the first synchronizer mechanism 1488 remains in contact with the output driver gear 1438. When the MM-EVT enters fixed gear operation from the first transmission gear ratio, the engine 1401 and EMB 1492 are providing propulsive force while EMA 1491 is generating electrical power. To switch to operate in the second transmission gear ratio, EMB 1492 is switched to a generating mode and EMA 1491 is switched to provide propulsive force. To complete the switch of the MM-EVT into the second transmission gear ratio with the engine 1401 and EMA 1491 providing propulsive force and EMB 1492 generating electrical power, the first synchronizer mechanism 1488 is moved out of contact with the output driver gear 1438 while the second synchronizer mechanism 1489 remains in contact with the output driver gear 1438. To switch the MM-EVT to operate in the first transmission gear ratio from the second transmission gear ratio, the MM-EVT is first switched to operate in the fixed gear state by adjusting the RPM of EMB 1492 to cause the RPM of the shaft 1405 to match the RPM of the output driver gear 1438. Once the RPM of the shaft 1405 approximates the RPM of the output driver gear 1438, the first synchronizer mechanism 1488 is moved into contact with the output driver gear 1438, thereby locking it to shaft 1405, while the second synchronizer mechanism 1489 remains in contact with the output driver gear 1438. When the MM-EVT enters fixed gear operation from the second transmission gear ratio, the engine 1401 and EMA 1491 are providing propulsive force while EMB 1492 is generating electrical power. To switch to operate in the first transmission gear ratio, EMA 1491 is switched to a generating mode and EMB 1492 is switched to provide propulsive force. To complete the switch of the MM-EVT into the first transmission gear ratio with the engine 1401 and EMB 1492 providing propulsive force and EMA 1491 generating electrical power, the second synchronizer mechanism 1489 is moved out of contact with the output driver gear 1438 while the first synchronizer mechanism 1488 remains in contact with the output driver gear 1438.

While the disclosed MM-EVTs of FIGS. 1, 2, 5, 6, 9, and 12-14 are shown with two forward gear ratios and, in some embodiments, a reverse/third gear ratio, the disclosed MM-EVT is not so limited. Any number of forward and/or reverse gear ratios and corresponding clutches and synchronizer mechanisms may be included within the MM-EVT as desired. The gear ratios and corresponding final drive ratios may be selected to be any desired underdrive or overdrive ratio as would be readily apparent to one of skill in the art to achieve the desired engine efficiency, power band, and/or vehicle performance. In addition, any type of clutching mechanism or arrangement may be utilized within the MM-EVT as would be known to one of skill in the art. For instance, the MM-EVT may utilize dry clutches, wet clutches, multi-plate clutches, dog clutches, synchronizer mechanisms, dual clutches as found in a conventional dry dual clutch transmission, or any other known clutching mechanism to achieve the disclosed clutching action. The clutching mechanisms may be located on any of the shafts within the MM-EVT. Further, planetary gear sets may be used in place of the layshaft arrangement. For example, referring to FIG. 1, the first driver gear 11/first driven gear 31 combination may be replaced by a first planetary gear set and the second driver gear 12/second driven gear 32 combination may be replaced by a second planetary gear set.

The switching between the first transmission gear ratio, fixed gear operation, and second transmission gear ratio can be performed at synchronous speeds, as disclosed above, or at non-synchronous speeds with the help of the oncoming clutch. When the switching is performed at non-synchronous speeds, the oncoming clutch overcomes and equalizes any difference in rotational speed of the clutched components. In addition, while some embodiments of the MM-EVT are not disclosed with a dedicated reverse gear, this is not to say that the MM-EVT of these embodiments cannot be operated in reverse. Rather, one or both of the electric motors A and B may be operated in a direction opposite to its typical direction of operation for forward propulsion in order to provide reverse operation for the MM-EVT.

In addition, the MM-EVT may utilize both motors to launch the vehicle. In one embodiment, the vehicle may be launched by reversing electric motor B while electric motor A is connected to the output gear and operated in the typical direction for forwards vehicle propulsion. It is also contemplated that electric motor A, or a combination of electric motor A and electric motor B may be used to start the vehicle engine. It should also be understood that while the specification refers to an electric motor B reduction gear set, the electric motor B reduction gear set need not be reduction gearing. Instead, the electric motor B reduction gear set may increase the output ratio of electric motor B or achieve any other desired output gear ratio for electric motor B.

One advantage of the disclosed embodiments is that an improved input-split planetary gear set configuration is provided. The multi-mode EVT may be operated in its desired efficiency and/or performance range more frequently. Further, the transmission reduces clutch torques and provides improved functionality in range-extended electric vehicles and battery electric vehicles. The multi-mode EVT is provided with a fixed gear operating capability for improved highway cruising and a reverse gear for vehicle reverse operation.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology and are intended to be covered by the following claims.

What is claimed is:

1. A transmission comprising:
a transmission input shaft;
a first planetary gear set comprising:
    a first sun gear,
    at least two first pinion gears meshed with the first sun gear,
    a first carrier coupled to the at least two first pinion gears and the transmission input shaft, and
    a first ring gear meshed with the at least two first pinion gears;
a first electric motor coupled to the first sun gear;
a second electric motor coupled to the first ring gear;
an output gear;
a reduction gear set coupled to the second electric motor, the reduction gear set comprising:
    a first gear coupled to the second electric motor,
    a second gear meshed with the first gear and coupled to a layshaft, and
    a third gear coupled to the layshaft and meshed with a reverse driver gear;
a reverse idler gear meshed with the reverse driver gear; and
a reverse driven gear meshed with the reverse idler gear,
wherein the output gear is selectively coupled to the first electric motor to provide a first transmission gear ratio and selectively coupled to the second electric motor to provide a second transmission gear ratio, and the reverse driven gear is selectively coupled to the output gear to provide a reverse gear ratio, and the reverse driver gear is selectively coupled to the output gear to provide the second transmission gear ratio.

2. A transmission comprising:
a transmission input shaft;
a planetary gear set comprising:
    a sun gear,
    a plurality of pinion gears meshed with the sun gear,
    a carrier coupled to the plurality of pinion gears and the transmission input shaft, and
    a ring gear meshed with the plurality of pinion gears;
a first electric motor directly coupled to the sun gear;
a second electric motor coupled to the ring gear;
an output gear;
a reduction gear set coupled to the second electric motor, the reduction gear set comprising:
    a first gear coupled to the second electric motor,
    a second gear meshed with the first gear and coupled to a layshaft, and
    a third gear coupled to the layshaft and meshed with a reverse driver gear;
a reverse idler gear meshed with the reverse driver gear; and
a reverse driven gear meshed with the reverse idler gear,
wherein the output gear is selectively coupled to the first electric motor to provide a first transmission gear ratio and is selectively coupled to the second electric motor to provide a second transmission gear ratio, and
wherein the reverse driven gear is selectively coupled to the output gear to provide a reverse gear ratio, and the reverse driver gear is selectively coupled to the output gear to provide the second transmission gear ratio.

* * * * *